US012187028B2

(12) United States Patent
Sugimoto et al.

(10) Patent No.: US 12,187,028 B2
(45) Date of Patent: Jan. 7, 2025

(54) PRINTING DEVICE INCLUDING MAIN BODY UNIT HAVING ATTACHMENT-DETACHMENT PORTION, AND PLATEN UNIT ATTACHABLE TO AND DETACHABLE FROM ATTACHMENT-DETACHMENT PORTION

(71) Applicant: BROTHER KOGYO KABUSHIKI KAISHA, Nagoya (JP)

(72) Inventors: Kiyoshi Sugimoto, Kuwana (JP); Takehiko Inaba, Chita (JP); Ryoya Takahashi, Gifu (JP); Yoshitsugu Tomomatsu, Nagoya (JP); Toshiyuki Furuyama, Chiryu (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 87 days.

(21) Appl. No.: 18/147,097

(22) Filed: Dec. 28, 2022

(65) Prior Publication Data

US 2023/0202211 A1 Jun. 29, 2023

(30) Foreign Application Priority Data

Dec. 28, 2021 (JP) ................................ 2021-214624

(51) Int. Cl.

| | |
|---|---|
| ***B41J 11/04*** | (2006.01) |
| ***B41J 3/407*** | (2006.01) |
| ***B41J 11/70*** | (2006.01) |
| ***B41J 15/04*** | (2006.01) |

(52) U.S. Cl.
CPC ............ *B41J 11/04* (2013.01); *B41J 3/4075* (2013.01); *B41J 11/70* (2013.01); *B41J 11/703* (2013.01); *B41J 15/042* (2013.01)

(58) Field of Classification Search
CPC . B41J 11/04; B41J 3/4075; B41J 11/70; B41J 11/703; B41J 15/042
See application file for complete search history.

(56) References Cited

U.S. PATENT DOCUMENTS 5,028,934 A * 7/1991 Kasai ........................ B41J 3/36 346/143
5,111,216 A * 5/1992 Richardson ................ B41J 3/36 347/171

(Continued)

FOREIGN PATENT DOCUMENTS

JP 2002-144648 A 5/2002
JP 2019-26416 A 2/2019

*Primary Examiner* — Henok D Legesse

(74) *Attorney, Agent, or Firm* — KENEALY VAIDYA LLP

(57) ABSTRACT

A printing device includes: a platen unit; and a main body unit. The platen unit includes a platen roller configured to convey a printing medium. The main body unit includes: a printing head; and an attachment-detachment portion which the platen unit is attachable to and detachable from. The printing head is configured to nip the printing medium in cooperation with the platen roller to perform printing on the printing medium. When the platen unit is attached to the attachment-detachment portion, the main body unit and the platen unit are assembled as a single unit. When the platen unit is detached from the attachment-detachment portion, the main body unit and the platen unit are separated as separate units.

6 Claims, 12 Drawing Sheets

(56) References Cited

U.S. PATENT DOCUMENTS

| | | | | |
|---|---|---|---|---|
| 5,201,588 | A * | 4/1993 | Sakai | B41J 15/042 400/663 |
| 5,431,504 | A * | 7/1995 | Beadman | B41J 3/4075 400/54 |
| 8,643,688 | B1 * | 2/2014 | Chen | B41J 11/0095 347/217 |
| 2019/0030928 | A1 | 1/2019 | Kanda et al. | |

* cited by examiner

PRINTING DEVICE INCLUDING MAIN BODY UNIT HAVING ATTACHMENT-DETACHMENT PORTION, AND PLATEN UNIT ATTACHABLE TO AND DETACHABLE FROM ATTACHMENT-DETACHMENT PORTION

REFERENCE TO RELATED APPLICATIONS

This application claims priority from Japanese Patent Application No. 2021-214624 filed on Dec. 28, 2021. The entire content of the priority application is incorporated herein by reference.

BACKGROUND ART

A printing device including a thermal head and a platen roller is known in the art. In this printing device, a tape to which a heat-sensitive label is adhered is nipped between the thermal head and the platen roller. The platen roller is configured to convey the tape while pressing the tape against the thermal head. At this time, the thermal head is configured to print a character(s) on the heat-sensitive label by heating the same.

The printing device also includes a main body unit, and a cover. The main body unit is configured to accommodate therein a tape roll formed by winding the tape. The cover is movably supported by the main body unit so as to open and close an opening of the main body unit. The thermal head is provided in the main body unit, while the platen roller is rotatably supported by a platen holder provided on a lower surface of the cover at a front end portion thereof. When the cover opens the opening of the main body unit, the thermal head and the platen roller are positioned away from each other. When the cover closes the opening, the thermal head and the platen roller are positioned close to each other.

DESCRIPTION

In the conventional printing device described above, the cover is provided integrally with the main body unit. Therefore, in a case where the printing device is accommodated in an external housing to be used as an assembly unit, there is a likelihood that an opening/closing posture of the cover hinders replacement of a printing medium (tape) depending on orientation in which the printing device is accommodated in the external housing.

In view of the foregoing, it is an object of the present disclosure to provide a printing device in which replacement of a printing medium can be facilitated.

In order to attain the above and other object, the present disclosure provides a printing device including: a platen unit; and a main body unit. The platen unit includes a platen roller configured to convey a printing medium. The main body unit includes: a printing head; and an attachment-detachment portion which the platen unit is attachable to and detachable from. The printing head is configured to nip the printing medium in cooperation with the platen roller to perform printing on the printing medium. When the platen unit is attached to the attachment-detachment portion, the main body unit and the platen unit are assembled as a single unit. When the platen unit is detached from the attachment-detachment portion, the main body unit and the platen unit are separated as separate units.

In the above structure, the main body unit and the platen unit can be separated as separated components when the platen unit is detached from the attachment-detachment portion of the main body unit. Accordingly, the printing medium can be disposed between the printing head and the platen roller easily, whereby replacement of the printing medium can be facilitated.

Figure 3:
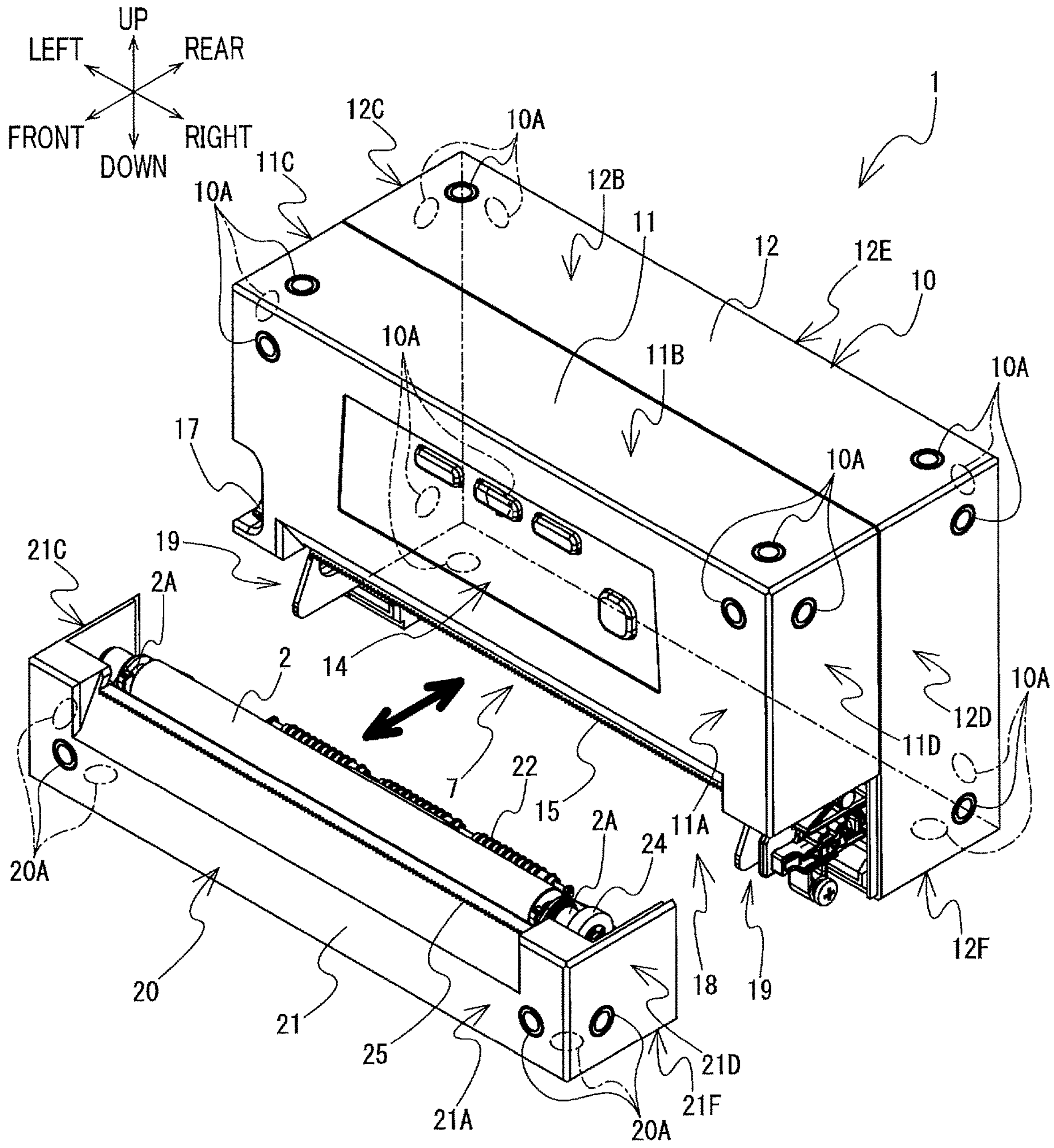

FIG. 3 is a front perspective view of the printing device 1 as viewed from the right-front side thereof, and particularly illustrating a state where a main body unit 10 and a platen unit 20 are separated from each other.

Figure 4:
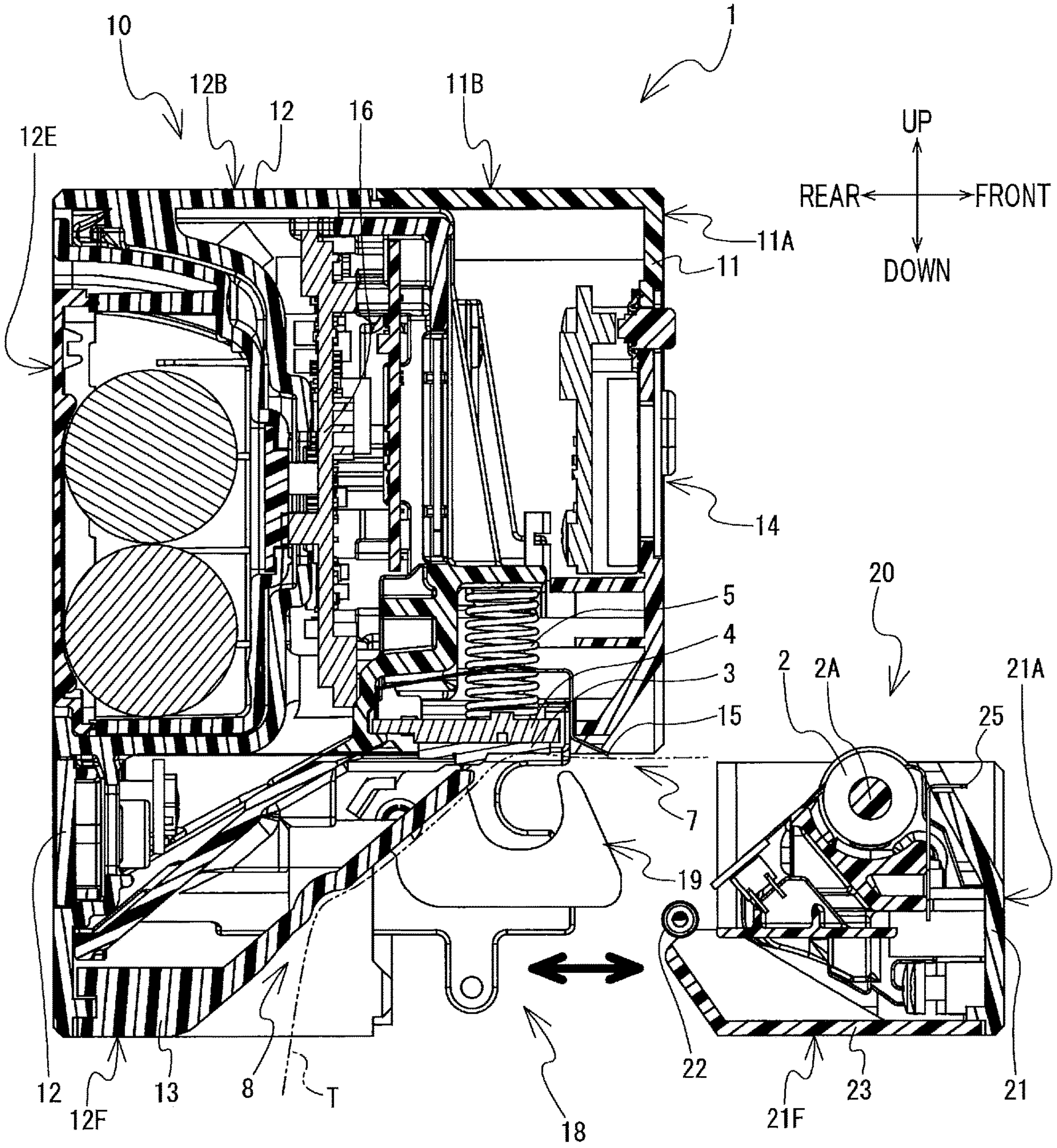

FIG. 4 is a vertical cross-sectional view of the printing device 1 as viewed from the left side thereof, and particularly illustrating the state where the main body unit 10 and the platen unit 20 are separated from each other.

Figure 5:
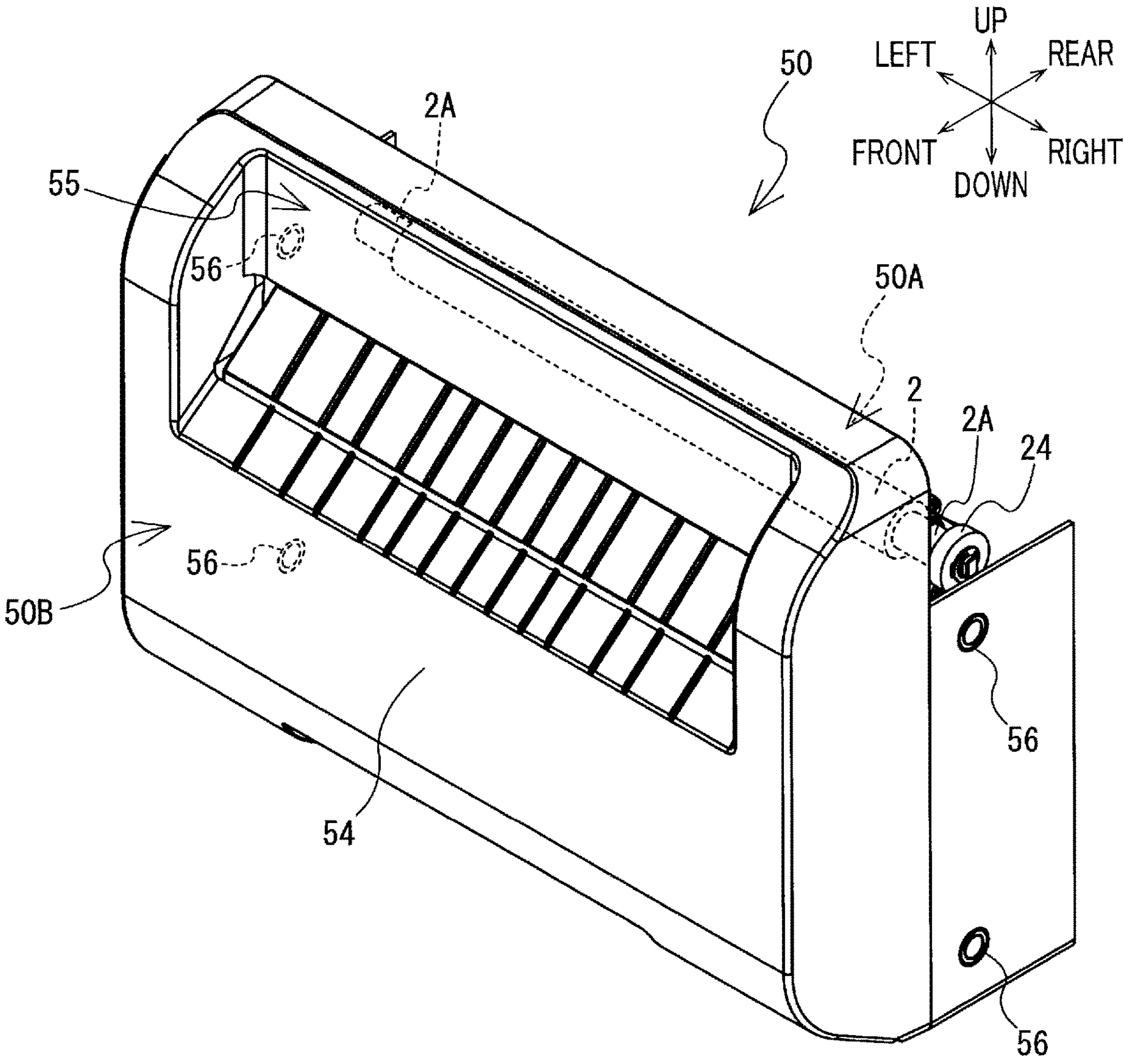

FIG. 5 is a front perspective view of a cutter unit 50 as viewed from the right-front side thereof.

Figure 6:
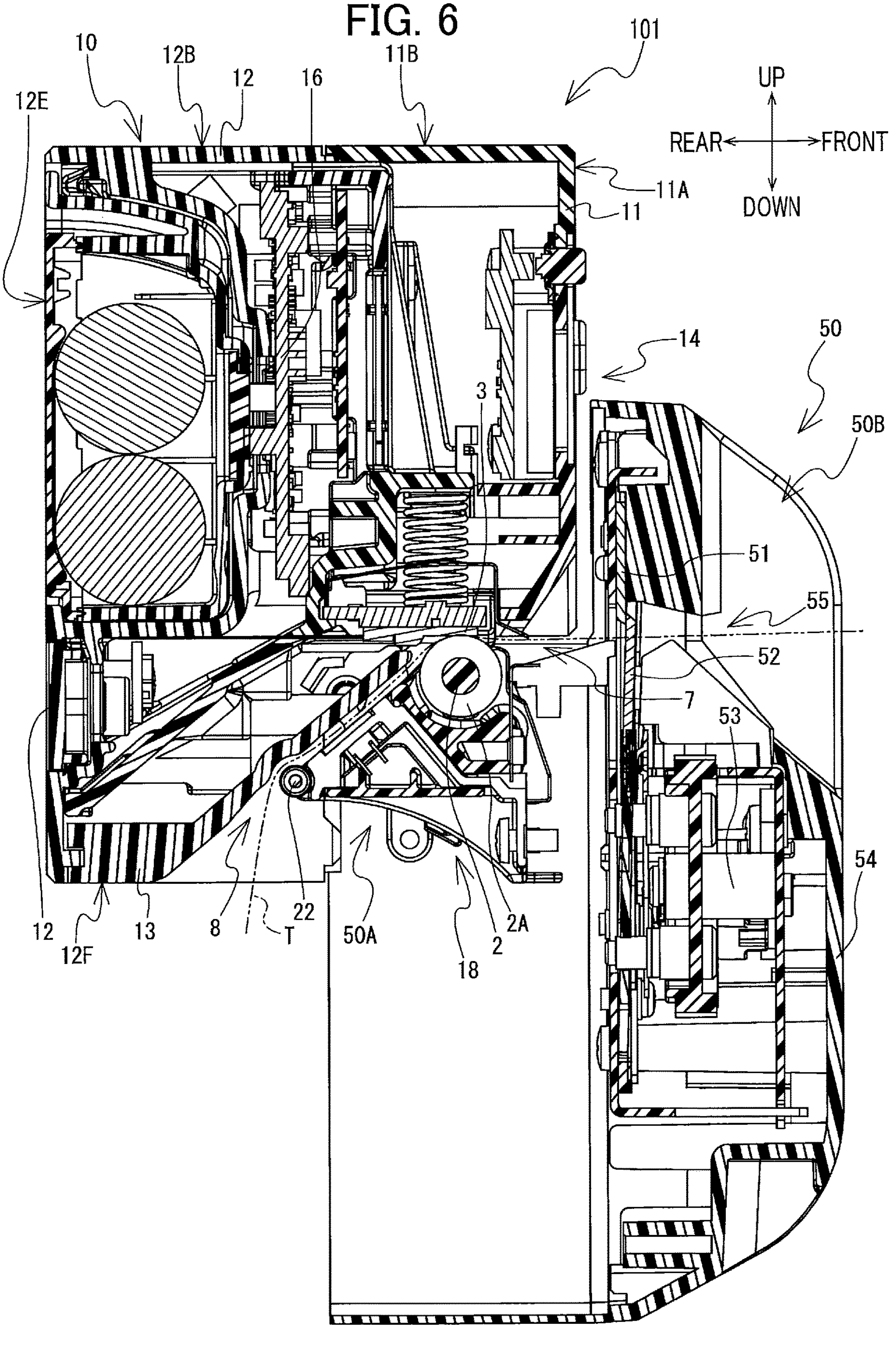

FIG. 6 is a vertical cross-sectional view of a printing device 101 as viewed from the left side thereof, and particularly illustrating a state where the main body unit 10 and the cutter unit 50 are assembled to each other.

Figure 7:
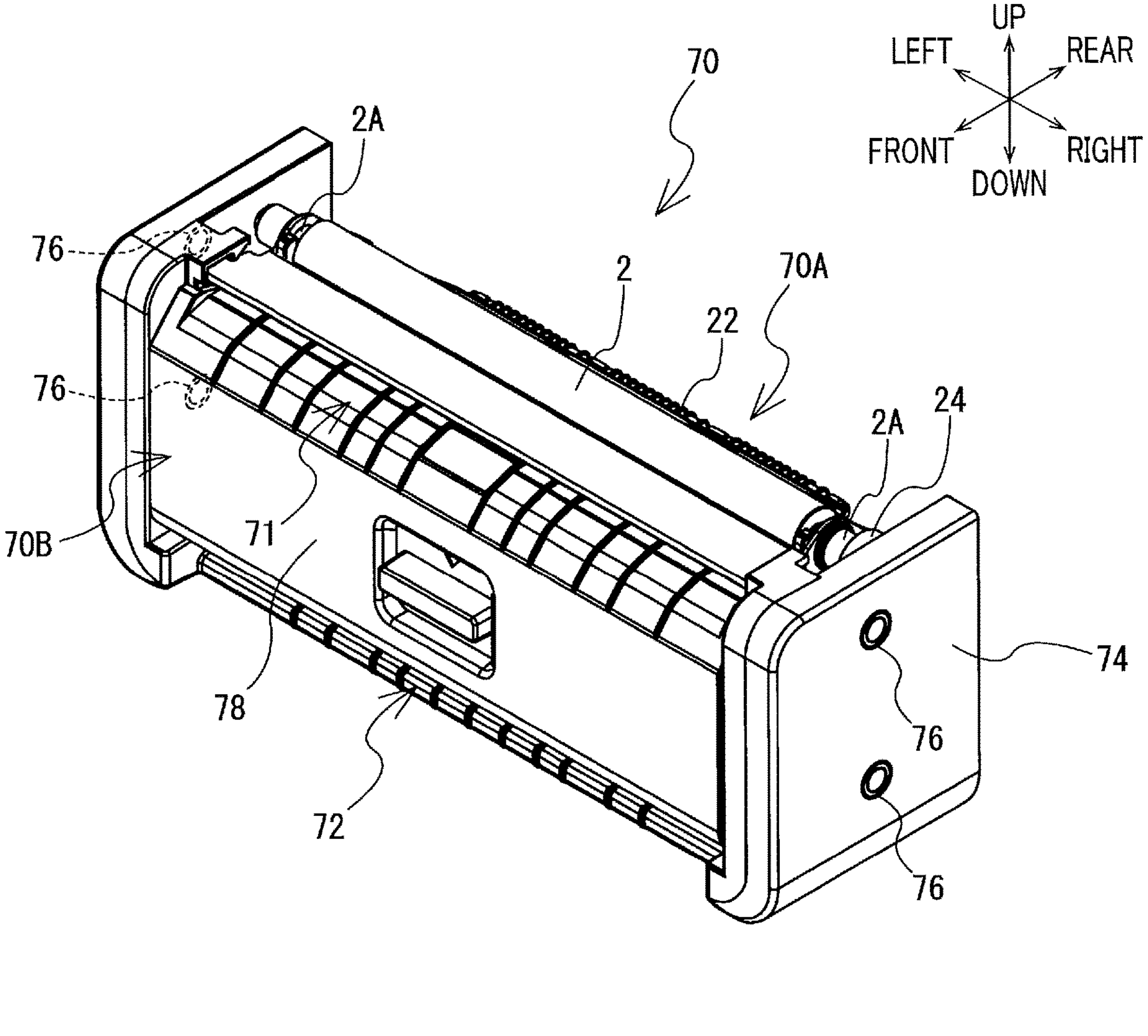

FIG. 7 is a front perspective view of a release unit 70 as viewed from the right-front side thereof.

Figure 8:
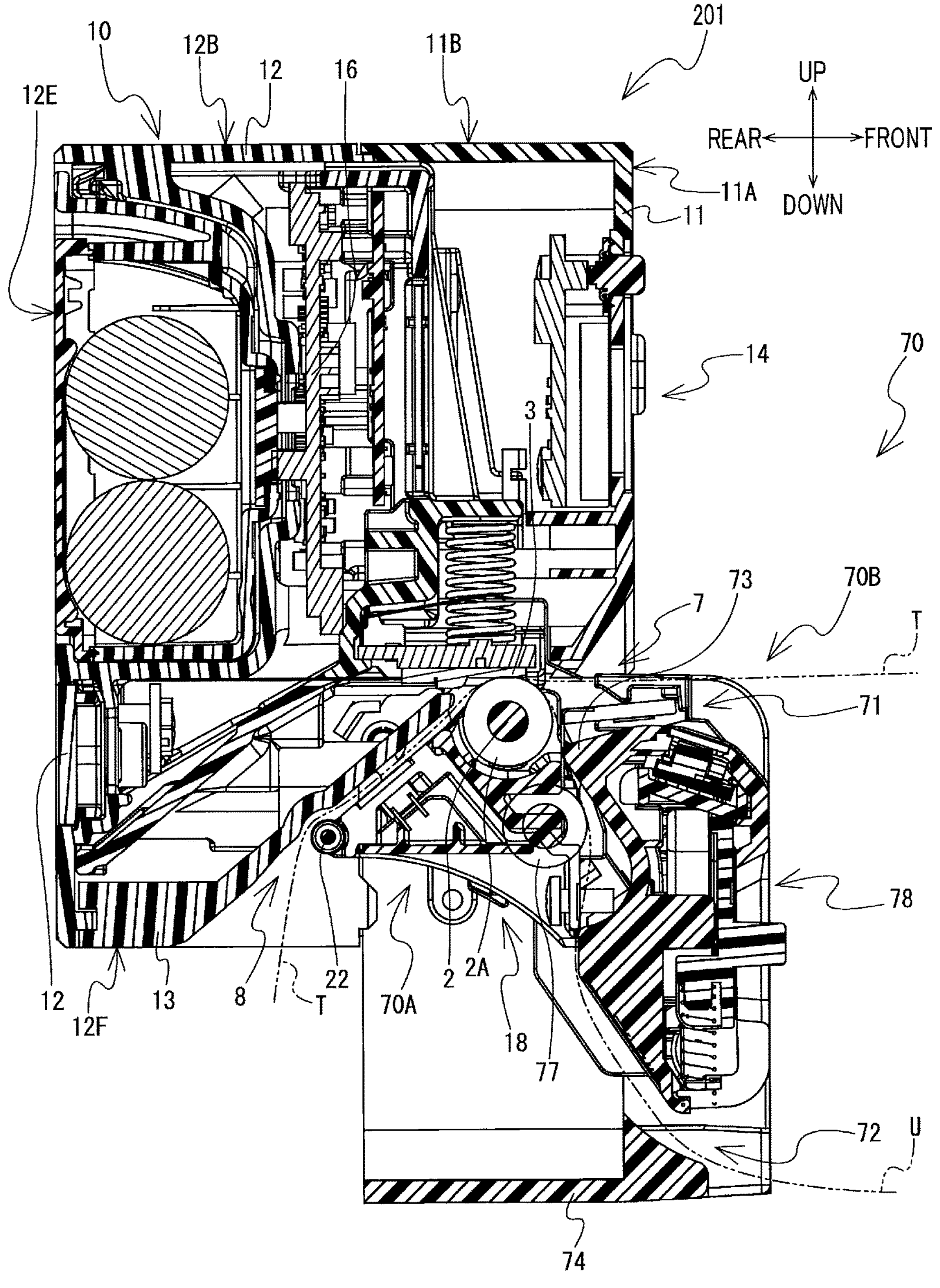

FIG. 8 is a vertical cross-sectional view of a printing device 201 as viewed from the left side thereof, and particularly illustrating a state where the main body unit 10 and the release unit 70 are assembled to each other.

Figure 9:
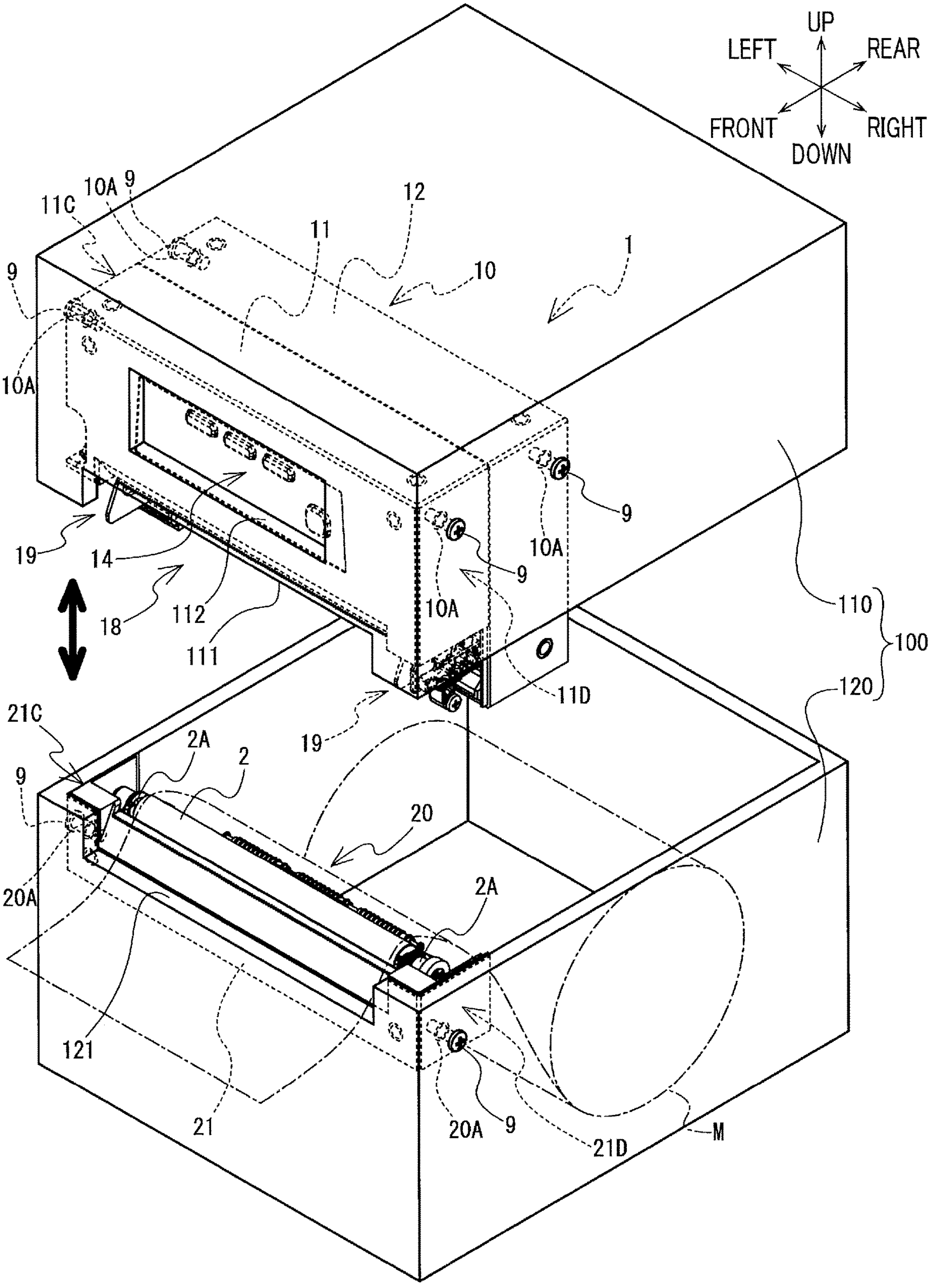

FIG. 9 is a perspective view of the main body unit 10 and the platen unit 20, and particularly illustrating a state where the main body unit 10 and the platen unit 20 are assembled to an external housing 100 while a discharge opening 7 of the printing device 1 is directed frontward.

Figure 10:
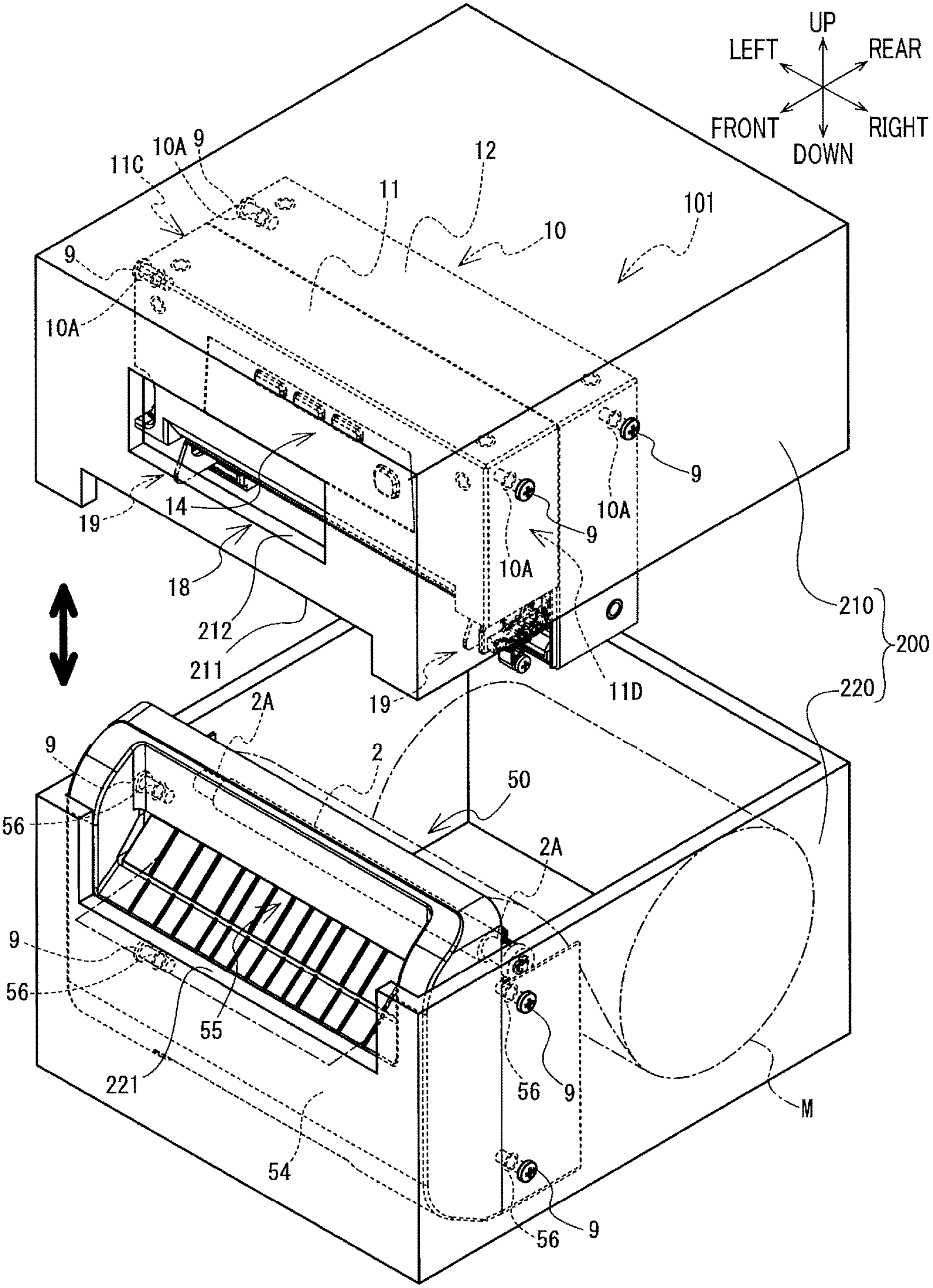

FIG. 10 is a perspective view of the main body unit 10 and the cutter unit 50, and particularly illustrating a state where the main body unit 10 and the cutter unit 50 are assembled to an external housing 200 while a discharge opening 7 of the printing device 101 is directed frontward.

Figure 11:
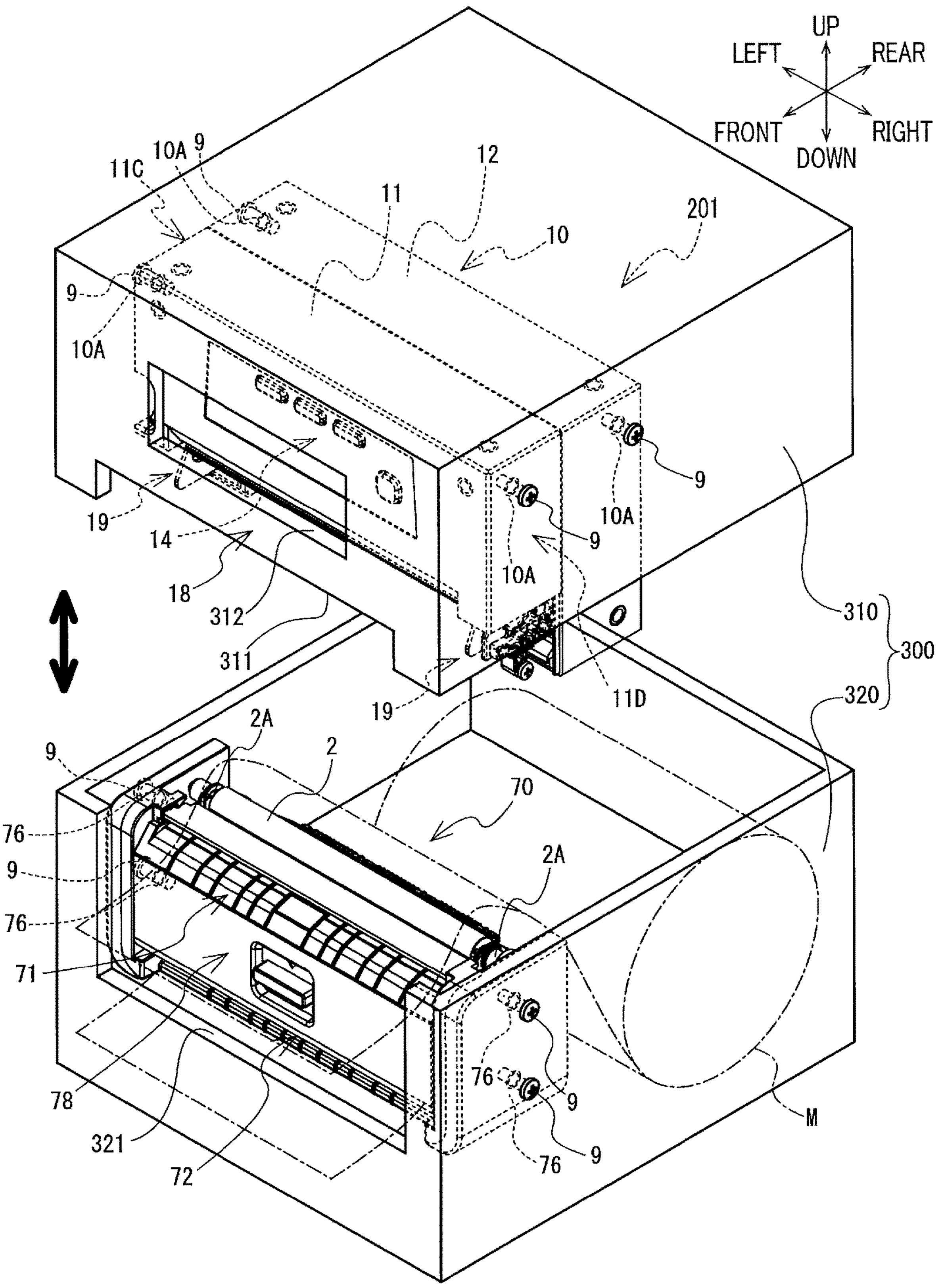

FIG. 11 is a perspective view of the main body unit 10 and the release unit 70, and particularly illustrating a state where the main body unit 10 and the release unit 70 are assembled to an external housing 300 while a discharge opening 7 of the printing device 201 is directed frontward.

Figure 12:
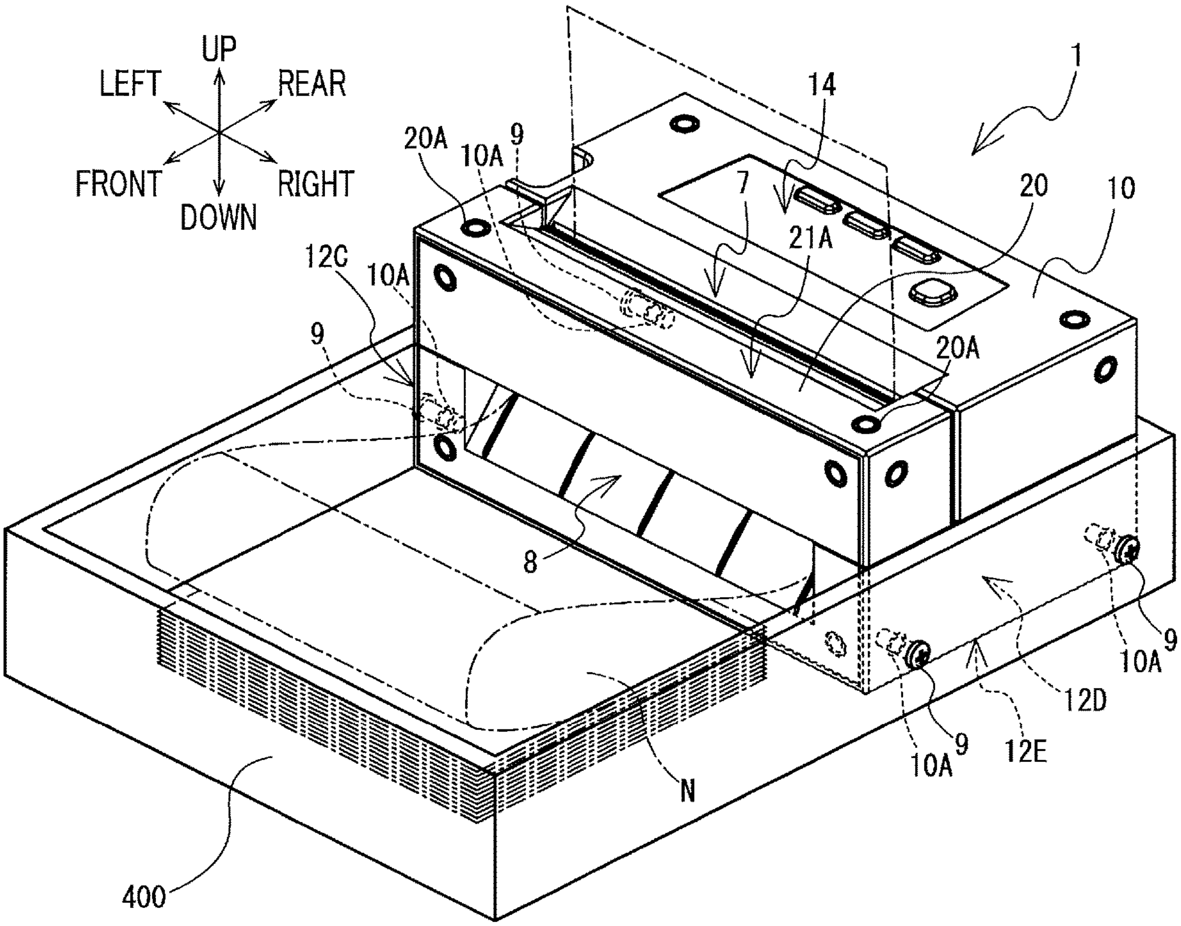

FIG. 12 is a perspective view of the main body unit 10 and the platen unit 20, and particularly illustrating a state where the main body unit 10 and the platen unit 20 are assembled to an external housing 400 while the discharge opening 7 of the printing device 1 is directed upward.

Hereinafter, one embodiment of the present disclosure will be described while referring to the accompanying drawings. The referenced drawings are merely used to describe the technical features that may be employed in the present disclosure. The configuration, the control, and the like of the apparatus described below are merely examples, and the present disclosure is not intended to be limited to these configurations, control, and the like.

An overview of a printing device 1 will be described. The printing device 1 can be connected to an external terminal (not illustrated) through wired communication using a USB cable, for example, or wireless communication such as a Wi-Fi, a Bluetooth, and the like. The printing device 1 is configured to print, on a printing medium, characters such as letters, figures, and the like on the basis of print data received from the external terminal. "USB" is a registered Japanese trademark of USB Implementers Forum, Inc. "Wi-Fi" is a registered Japanese trademark of Wi-Fi alliance.

"Bluetooth" is a registered Japanese trademark of Bluetooth Special Interested Group, Inc.

The printing medium is configured of an elongated heat-sensitive label and is a non-adhesive tape. That is, an adhesive agent is not adhered to the heat-sensitive label. Alternatively, the printing medium may be an adhesive tape whose heat-sensitive label has one side surface to which an adhesive agent is attached and a release paper is adhered to the one side surface, or may be a linerless tape to which an adhesive agent is adhered to one side surface of the heat-sensitive label but a release paper is not adhered thereto. The printing medium is provided in a form of a roll shape formed by winding the printing medium about a core medium, or in a folded paper shape formed by folding the printing medium. The external terminal is a general-purpose personal computer (PC).

The printing device 1 can be assembled to an external housing 100 (see FIG. 9) for use with in same. The external housing 100 has various types according to various services provided using the printing device 1. The printing device 1 includes outer covers 11, 12, and 21. A plurality of insert nuts for fixing the printing device 1 to the external housing 100 are provided in the outer covers 11, 12, and 21. Specifically, insert nuts 10A are provided in the outer covers 11 and 12, and insert nuts 20A are provided in the outer cover 21. With this configuration, a user can select appropriate orientations for assembling the printing device 1 to the external housing 100 depending on the use of the external housing 100.

Next, a configuration of the printing device 1 will be described with reference to FIGS. 1 to 4. Hereinafter, the lower-left side, the upper-right side, the upper-left side, the lower-right side, the upper side, and the lower side in FIG. 1 will be defined as a front side, a rear side, a left side, a right side, an upper side, and a lower side of the printing device 1, respectively.

The printing device 1 has a generally rectangular parallelepiped (box-like) shape elongated in a left-right direction. The printing device 1 includes a main body unit 10, and a platen unit 20. The main body unit 10 includes a printing head 3. The platen unit 20 includes a platen roller 2. The platen unit 20 constitutes a lower-front portion of the printing device 1, and the main body unit 10 constitutes an upper-front portion and a rear portion of the printing device 1. The main body unit 10 and the platen unit 20 can be assembled to each other as a single unit (see FIG. 1), and can be separated from each other as completely separate components (see FIG. 3).

The main body unit 10 includes the outer covers 11 and 12, an operating portion 14, the printing head 3, a driving mechanism (not illustrated), and a control board 16. The outer cover 11 constitutes an upper-front portion of an outer shell of the printing device 1, and has a front surface 11A, an upper surface 11B, a left surface 11C, and a right surface 11D. The front surface 11A constitutes an upper portion of a front surface of the printing device 1, and the upper surface 11B constitutes a front portion of an upper surface of the printing device 1. The left surface 11C constitutes an upper-front portion of a left surface of the printing device 1. The right surface 11D constitutes an upper-front portion of a right surface of the printing device 1.

The outer cover 12 constitutes a rear portion of the outer shell of the printing device 1, and has an upper surface 12B, a left surface 12C, a right surface 12D, a rear surface 12E, and a bottom surface 12F. The upper surface 12B constitutes a rear portion of the upper surface of the printing device 1. The left surface 12C constitutes a rear portion of the left surface of the printing device 1, and the right surface 12D constitutes a rear portion of the right surface of the printing device 1. The rear surface 12E constitutes a rear surface of the printing device 1, and the bottom surface 12F constitutes a rear portion of a bottom surface of the printing device 1.

At left-front and right-front corner portions of an upper portion of the outer cover 11, the insert nuts 10A are embedded in corresponding surfaces of the front surface 11A, the upper surface 11B, the left surface 11C, and the right surface 11D. Also, at upper-left, lower-left, upper-right, and lower-right corner portions of a rear portion of the outer cover 12, the insert nuts 10A are embedded in corresponding surfaces of the upper surface 12B, the left surface 12C, the right surface 12D, the rear surface 12E, and the bottom surface 12F. The insert nuts 10A are provided so as to be spaced apart from the corresponding corner portions of the main body unit 10 by distances the same as each other. Bolts 9 (described later) used to fix the main body unit 10 to the external housing 100 can be fastened to the insert nuts 10A, respectively, whereby the printing device 1 is assembled to the external housing 100.

The operating portion 14 is provided at the front surface 11A of the outer cover 11. The operating portion 14 includes an input portion and a display portion. The input portion is configured to receive operations such as input of various types of information and turning on and off of the printing device 1. The display portion is configured to display various information thereon. A discharge opening 7 is formed on the front surface of the printing device 1 at a position below the operating portion 14. More specifically, the discharge opening 7 is formed between the main body unit 10 and the platen unit 20 in a state where the main body unit 10 and the platen unit 20 are assembled to each other. The printing medium having an image printed thereon is discharged out of the printing device 1 through the discharge opening 7.

The front surface 11A of the outer cover 11 has a lower end portion forming a part of the discharge opening 7. The front surface 11A has a portion inclined diagonally rearward and downward as approaching an internal space of the discharge opening 7. The main body unit 10 further includes a cutting blade 15 provided near the discharge opening 7 and configured to cut the printing medium after printing operation has been performed thereon. The cutting blade 15 extends in the left-right direction. The cutting blade 15 cuts the printing medium when the printed printing medium is pulled upward, i.e., toward the main body unit 10.

The printing head 3 is disposed rearward of the cutting blade 15. The printing head 3 includes a plurality of heating elements at a lower portion thereof. The plurality of heating elements are arrayed in line in the left-right direction. The printing head 3 is configured to heat the printing medium using the plurality of heating elements in order to print characters on the heat-sensitive label. A heat sink 4 is provided above the printing head 3. The printing head 3 and the heat sink 4 are fixed integrally to each other, and are urged downward due to an urging force of a spring 5.

The main body unit 10 has a lower-front portion serving as an attachment-detachment portion 18 to which the platen unit 20 is attachable and from which the platen unit 20 is detachable. The platen unit 20 can be assembled to the main body unit 10 as a single unit at the attachment-detachment portion 18 of the main body unit 10, and the platen unit 20 can be separated from the main body unit 10 at the attachment-detachment portion 18 as completely separated units. That is, the main body unit 10 and the platen unit 20 are assembled as a single unit when the platen unit 20 is attached to the attachment-detachment portion 18, and are separated as separate units when the platen unit 20 is detached from the attachment-detachment portion 18. In a state where the platen unit 20 is separated from the main body unit 10, the printing head 3 is exposed to an outside at the attachment-detachment portion 18.

The driving mechanism is a motor (not illustrated) provided at a right portion inside the main body unit 10, and is connected to a main body gear (not illustrated) provided at a lower-front portion of the right portion of the main body unit 10 via a plurality of the gears. In a state where the main body unit 10 and the platen unit 20 are assembled together, the main body gear is in meshing engagement with a platen gear 24 coupled to a right end of the platen roller 2 of the platen unit 20. As such, a rotational driving force of the motor is transmitted to the platen roller 2 via the main body gear and the platen gear 24 to rotate the platen roller 2.

The control board 16 is disposed upward and rearward of the printing head 3. A CPU, a ROM, a RAM, and the like are mounted on the control board 16. The control board 16 is configured to control driving of the printing device 1. The printing device 1 is driven by electrical power supplied from an external power source in the present embodiment. However, the printing device 1 has a rear portion configured to receive a battery, and may be driven by electrical power supplied from a battery attached thereto.

The printing device 1 is formed with a supply opening 8 at a bottom portion thereof. Specifically, the supply opening 8 is provided on the bottom surface of the printing device 1 at a portion between the main body unit 10 and the platen unit 20 assembled together. A portion of the outer cover 12 having the bottom surface 12F is provided as a separate component than another portion of the outer cover 12, and serves as a guide member 13.

The guide member 13 extends frontward from a rear-lower corner portion of the printing device 1, bends toward the supply opening 8 (toward an internal space of the printing device 1), and further extends diagonally frontward and upward to a portion near the printing head 3. The guide member 13 is configured to guide the printing medium inserted through the supply opening 8 to the printing head 3. In a state where the platen unit 20 is separated from the main body unit 10, the guide member 13 is exposed to the outside at the attachment-detachment portion 18.

The main body unit 10 further includes a lever 17 at a left portion thereof. The user operates the lever 17 in order to separate the platen unit 20 assembled to the main body unit 10 from the main body unit 10. The lever 17 causes a pair of engagement portions 19 of the attachment-detachment portion 18 to be moved when operated by the user. The engagement portions 19 are provided at a left-front portion and a right-front portion in the lower portion of the main body unit 10, respectively. That is, the engagement portions 19 are provided outward of the discharge opening 7 in the left-right direction. The engagement portions 19 are configured to engage with a shaft 2A (described later) of the platen roller 2 of the platen unit 20 when the main body unit 10 and the platen unit 20 are assembled to each other.

In a state where the main body unit 10 and the platen unit 20 are assembled to each other and the lever 17 is not operated by the user, the engagement portions 19 are in engagement with the shaft 2A to position the platen roller 2. A spring (not illustrated) is provided on each of the engagement portions 19. In a state where the main body unit 10 and the platen unit 20 are assembled to each other and the lever 17 is not operated by the user, the engagement portions 19 are maintained at a state where the engagement portions 19 are engaged with the shaft 2A due to an urging force generated by the springs. When the lever 17 is operated by the user, the engagement portions 19 become disengaged from the shaft 2A against the urging force generated by the springs, and therefore the platen unit 20 can be separated from the main body unit 10 at the attachment-detachment portion 18.

The platen unit 20 includes the outer cover 21, the platen roller 2, and a guide roller 22. The outer cover 21 constitutes a lower-front portion of the outer shell of the printing device 1, and has a front surface 21A, a left surface 21C, a right surface 21D, and a bottom surface 21F. The front surface 21A constitutes a lower portion of the front surface of the printing device 1. The left surface 21C constitutes a lower-front portion of the left surface of the printing device 1. The right surface 21D constitutes a lower-front portion of the right surface of the printing device 1. The bottom surface 21F constitutes a front portion of the bottom surface of the printing device 1.

At left-front and right-front corner portions of a lower portion of the outer cover 21, the insert nuts 20A are embedded in respective surfaces of the front surface 21A, the left surface 21C, the right surface 21D, and the bottom surface 21F. The insert nuts 20A are provided so as to be spaced apart from the corresponding corner portions of the platen unit 20 by distances the same as each other. The distances between the insert nuts 20A and the corner portions corresponding thereto are equal to the distances between the insert nuts 10A and the corner portions corresponding thereto. Bolts 9 used to fix the platen unit 20 to the external housing 100 to which the printing device 1 is assembled can be fastened to the respective insert nuts 20A.

The front surface 21A of the outer cover 21 has an upper end portion forming a part of the discharge opening 7. The front surface 21A has a portion inclined diagonally rearward and upward toward the discharge opening 7. The platen unit 20 further includes a cutting blade 25 provided near the discharge opening 7. The cutting blade 25 is configured to cut the printing medium having an image printed thereon. The cutting blade 25 extends in the left-right direction, and is used to cut the printing medium when the printing medium is pulled downward, i.e., toward the platen unit 20.

The platen roller 2 has a solid cylindrical shape and extends in the left-right direction. The platen roller 2 includes the shaft 2A extending in the left-right direction. The shaft 2A has left and right ends protruding outward of the platen roller 2. The left and right ends of the shaft 2A are supported rotatably at an upper portion inside the platen unit 20. When the main body unit 10 and the platen unit 20 are assembled to each other, the platen roller 2 is positioned close to the plurality of heating elements of the printing head 3. In a case where the printing medium is placed between the printing head 3 and the platen roller 2, the printing head 3 presses the printing medium against the platen roller 2 due to the urging force of the spring 5. Accordingly, the platen roller 2 can nip the printing medium in cooperation with the printing head 3 and convey the same by rotation thereof.

The platen gear 24 (see FIG. 3) is coupled to the right end of the shaft 2A. When the main body unit 10 and the platen unit 20 are assembled to each other, the platen gear 24 is in meshing engagement with the main body gear of the main body unit 10. The platen roller 2 is configured to convey the printing medium nipped between the platen roller 2 and the printing head 3 by rotating due to a driving force of the motor of the main body unit 10.

The guide roller 22 is provided at a position rearward and downward of the platen roller 2. The guide roller 22 is a roller including a plurality of circular-shaped flange portions arranged in the left-right direction. The guide roller 22 is disposed such that the guide roller 22 is positioned close to an approximate center portion in the up-down direction of the guide member 13 of the main body unit 10 with a gap between the guide roller 22 and the guide member 13 when the platen unit 20 and the main body unit 10 are assembled to each other. The guide roller 22 forms a path (a conveying path T described later) between the guide roller 22 and the guide member 13 such that the printing medium inserted through the supply opening 8 is guided by the guide member 13 of the main body unit 10 toward the printing head 3.

Of the outer cover 21 of the platen unit 20, a portion having the bottom surface 21F is provided as a separate component than another portion of the outer cover 21, and functions as a guide member 23. The guide member 23 extends rearward from a lower-front corner portion of the outer cover 21 and bends toward the supply opening 8, and further extends rearward and upward toward the guide roller 22. The guide member 23 is configured to guide the printing medium toward the guide roller 22 such that the printing medium that have reached the guide roller 22 is guided to the printing head 3 by the guide member 13 of the main body unit 10.

Figure 1:
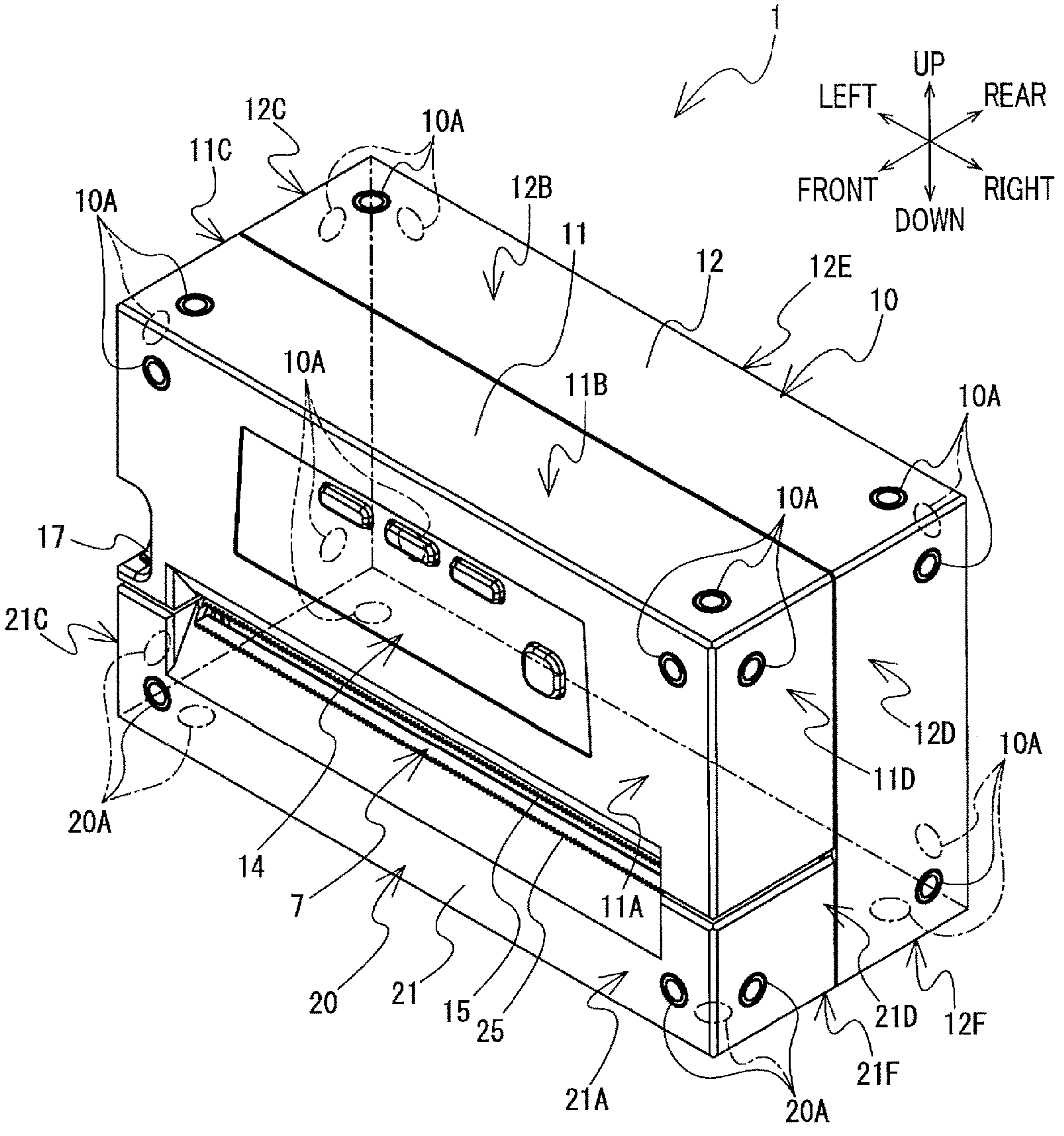
FIG. 1 is a front perspective view of a printing device 1 as viewed from the right-front side thereof.
Figure 2:
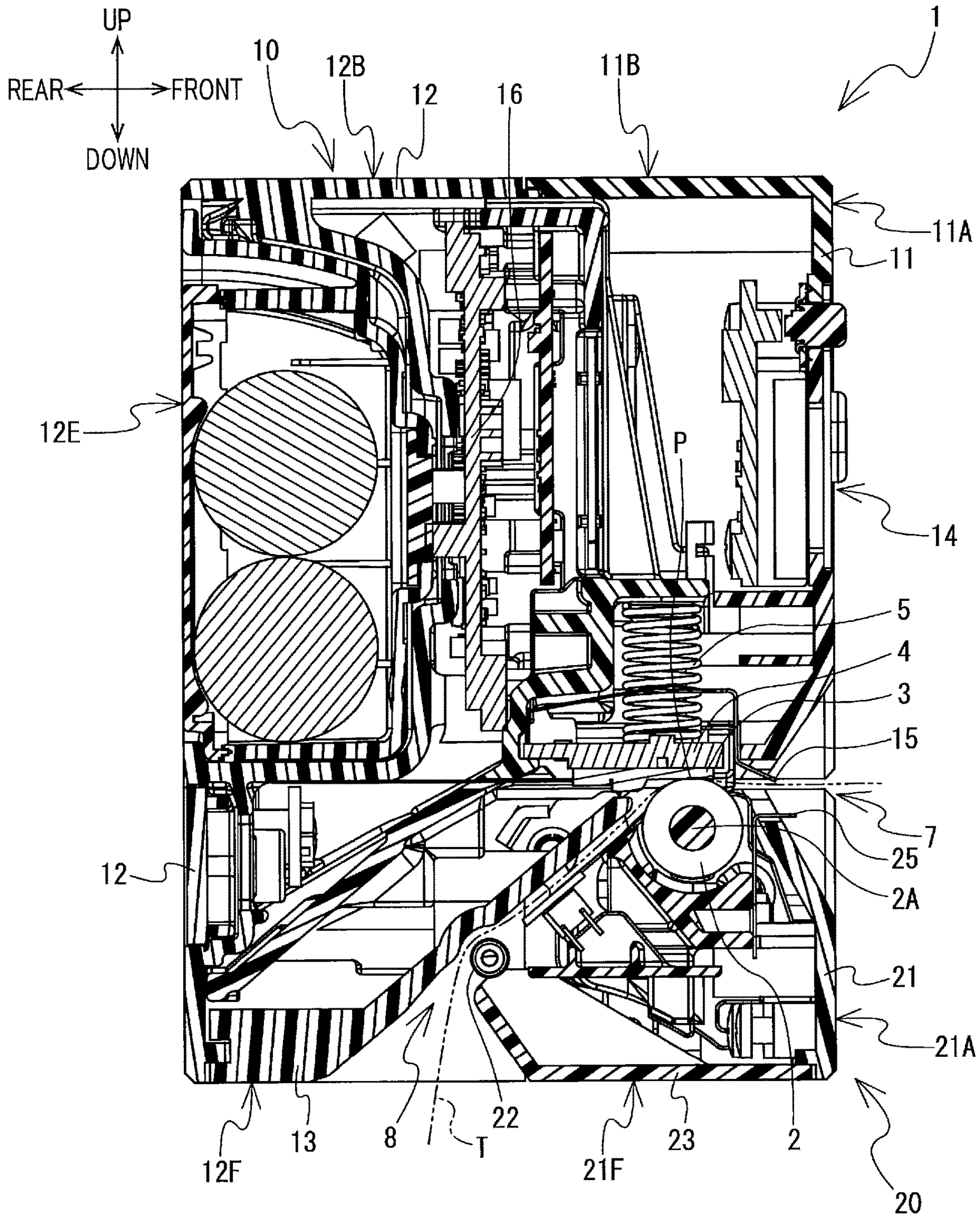
FIG. 2 is a vertical cross-sectional view of the printing device 1 as viewed from the left side thereof.

As illustrated in FIG. 2, in a state where the main body unit 10 and the platen unit 20 are assembled to each other, the platen roller 2 is in contact with the printing head 3 from below. Hereinafter, the position at which the platen roller 2 is in contact with the printing head 3 will be referred to as "printing position P". The printing position P is a position at which an image is formed on the heat-sensitive label when the plurality of heating elements generates heat while the printing medium is nipped between the platen roller 2 and the printing head 3.

The printing medium is guided by the guide member 13, the guide member 23, and the guide roller 22 to be conveyed toward the printing head 3 through the supply opening 8. The conveying path T along which the printing medium is conveyed extends diagonally frontward and upward from the supply opening 8. Furthermore, the conveying path T is bended frontward at a position near a rear portion of the printing head 3, passes through the printing position P, and extends frontward toward the discharge opening 7. The platen roller 2 is positioned on the conveying path T at the printing position P. As illustrated in FIG. 4, in a state where the platen unit 20 is separated from the main body unit 10, the conveying path T of the printing medium is exposed to the outside at the attachment-detachment portion 18 of the main body unit 10.

In place of the platen unit 20, another platen unit including the platen roller 2 described above can be assembled to and can be separated from the main body unit 10. The other platen unit has additional functions according to the intended use thereof.

A cutter unit 50 as an example of the other platen unit will be described with reference to FIGS. 5 and 6. The cutter unit 50 includes a conveying unit 50A functioning to convey the printing medium similar to the platen unit 20, and a cutting unit 50B functioning to cut the printed printing medium. The conveying unit 50A includes the platen roller 2 and the guide roller 22 similar to the platen unit 20. When the cutter unit 50 is assembled to the main body unit 10 to constitute a printing device 101, the engagement portions 19 and the shaft 2A of the platen roller 2 are brought into engagement with each other at the attachment-detachment portion 18 of the main body unit 10, whereby the conveying unit 50A is attached to the attachment-detachment portion 18.

The cutting unit 50B is disposed frontward of the conveying unit 50A. The cutting unit 50B has a box-like shape, and extends downward from a position frontward of the operating portion 14 when the cutter unit 50 is assembled to the main body unit 10. The cutting unit 50B includes a fixed blade 51, a movable blade 52, and a drive motor 53. The fixed blade 51 and the movable blade 52 are disposed frontward of the discharge opening 7 when the cutter unit 50 is assembled to the main body unit 10. The fixed blade 51 is positioned upward of a conveying path T along which the printed medium to be discharged through the discharge opening 7 is conveyed, while the movable blade 52 is positioned downward of the conveying path T. The drive motor 53 is positioned downward and frontward of the movable blade 52, and configured to drive the movable blade 52 to be moved in the up-down direction. The fixed blade 51 and the movable blade 52 are configured to cut the printing medium interposed therebetween after printing has been performed on the printing medium.

The cutter unit 50 also includes an outer cover 54 constituting an outer shell of the cutter unit 50. The outer cover 54 covers an upper portion, a lower portion, a front portion, a left portion, and a right portion of the cutting unit 50B, and a left portion and a right portion of the conveying unit 50A. The outer cover 54 is formed with a discharge opening 55 through which the printing medium is discharged after the printing medium is cut. The discharge opening 55 is open on an upper surface and a front surface of the outer cover 54. When the cutter unit 50 and the main body unit 10 are assembled to each other, the discharge opening 55 is positioned frontward of the discharge opening 7 of the main body unit 10, and the fixed blade 51 and the movable blade 52 are positioned between the discharge opening 55 and the discharge opening 7.

The outer cover 54 also has a left surface and a right surface. A pair of insert nuts 56 arranged in the up-down direction are embedded in each of the left surface and the right surface of the outer cover 54. Bolts 9 can be fastened to the respective insert nuts 56 to fix the cutter unit 50 to the external housing 100, whereby the printing device 101 can be assembled to the external housing 100.

Next, a release unit 70 will be described with reference to FIGS. 7 and 8. The release unit 70 can also be assembled to the main body unit 10 and can be separated from the main body unit 10 instead of the platen unit 20 or the cutter unit 50. The release unit 70 includes a conveying unit 70A configured to convey the printing medium similar to the platen unit 20, and a releasing unit 70B configured to release a release paper from the printed printing medium. In a case where the release unit 70 is assembled to the main body unit 10 to constitute a printing device 201, an adhesive tape is employed as the printing medium. The adhesive tape has a front surface on which printing is to be performed, and a back surface opposite the front surface. The back surface of the adhesive tape has a release paper adhered thereto through an adhesive agent.

The conveying unit 70A includes the platen roller 2 and the guide roller 22 those are also employed in the platen unit 20. When the release unit 70 is assembled to the main body unit 10, the shaft 2A of the platen roller 2 is brought into engagement with the engagement portions 19 (see FIG. 4) at the attachment-detachment portion 18 of the main body unit 10, thereby enabling the conveying unit 70A to be attached to the attachment-detachment portion 18. Accordingly, assembly of the release unit 70 to the main body unit 10 is completed.

The releasing unit 70B is provided frontward of the conveying unit 70A. The releasing unit 70B has a box-like shape, and extends downward from a position frontward of the discharge opening 7 when the release unit 70 is assembled to the main body unit 10. The releasing unit 70B includes a releasing pawl 73, a feeding roller 77, and is formed with a discharge opening 72. The releasing pawl 73 is positioned diagonally frontward and downward of the platen roller 2. The releasing pawl 73 is configured to separate a mount (i.e., the release paper) from the back surface of the printing medium that has passed through the printing position P, i.e., the printing medium having an image printed on the front surface thereof. The feeding roller 77 is disposed downward of the releasing pawl 73 and configured to convey the mount separated from the printing medium downward inside the releasing unit 70B. The discharge opening 72 is formed at a lower portion of the releasing unit 70B to allow the mount separated from the printing medium and conveyed by the feeding roller 77 to be discharged frontward therethrough.

The release unit 70 also includes an outer cover 74 covering an upper portion, a lower portion, a front portion, a left portion, and a right portion of the releasing unit 70B, and a left portion and a right portion of the conveying unit 70A. The outer cover 74 has an upper surface formed with an opening serving as a discharge opening 71. The discharge opening 71 allows the printed printing medium to be discharged therethrough after the mount is separated from the printing medium.

The outer cover 74 has a front surface serving as a lid 78 movable between an open position and a closed position. The lid 78 has a shaft at a lower end portion thereof, and the lid 78 is pivotally movable about the shaft so that an upper end portion of the lid 78 is moved frontward and downward. The releasing pawl 73 is provided on the lid 78. When the lid 78 is in the open position, a mount path U through which the mount separated from the printing medium is guided toward the discharge opening 72 is exposed to an outside. When assembling the release unit 70 to the main body unit 10, the user moves the lid 78 to the open position, arranges the mount released from the printing medium to be positioned in the mount path U through the discharge opening 72, and then moves the lid 78 to the closed position.

The outer cover 74 further has a left surface and a right surface. A pair of insert nuts 76 arranged in the up-down direction are embedded in each of the left surface and the right surface of the outer cover 74. Bolts 9 for fixing the release unit 70 to the external housing 100 can be fastened to the respective insert nuts 76 in the outer cover 74.

Next, examples of assembly of the printing device 1 to the external housing 100 will be described. The printing device 1 including the main body unit 10 and the platen unit 20 can be assembled to various kinds of the external housing 100 to be used in the same. The external housing 100 illustrated in FIG. 9 includes an upper housing 110 and a lower housing 120 each having a parallelepiped (box-like) shape. The upper housing 110 and the lower housing 120 can be separated in the up-down direction. The upper housing 110 has a lower portion formed with an opening, and the main body unit 10 can be assembled to an internal space of the upper housing 110. The internal space of the upper housing 110 has a dimension in the left-right direction the same as a dimension in the left-right direction of the main body unit 10.

The upper housing 110 has a front surface whose lower end portion is formed with a notch portion 111 extending in the left-right direction. An opening 112 is also formed in the front surface of the upper housing 110 at a position above the notch portion 111. The upper housing 110 also has a left surface and a right surface. A pair of screw holes is formed at an upper-front portion of each of the left surface and the right surface of the upper housing 110.

In this example, the main body unit 10 is inserted into the internal space of the upper housing 110, and the bolts 9 are inserted through the screw holes formed in the upper housing 110 and fastened to the insert nuts 10A at upper portions of the left surface 11C, the right surface 11D, the left surface 12C, and the right surface 12D, respectively. As a result, the main body unit 10 is assembled to the upper housing 110, the operating portion 14 is exposed to an outside of the external housing 100 through the opening 112, and a portion of the main body unit 10 constituting the discharge opening 7 is arranged at a position at which the notch portion 111 is formed.

The lower housing 120 has an upper portion formed with an opening, and the platen unit 20 can be assembled to an internal space of the lower housing 120. A dimension in the left-right direction of the internal space of the lower housing 120 is the same as a dimension in the left-right direction of the platen unit 20. The lower housing 120 is formed with a notch portion 121 extending in the left-right direction similar to the upper housing 110. The notch portion 121 is formed on an upper end portion of a front surface of the lower housing 120. The lower housing 120 has a left surface and a right surface, and a screw hole is formed in an upper-front portion of each of the left surface and the right surface.

The platen unit 20 is arranged in the internal space of the lower housing 120, and the bolts 9 inserted through the screw holes formed in the left surface and the right surface of the lower housing 120 are fastened to the insert nuts 20A of the left surface 21C and the right surface 21D, respectively. In this way, the platen unit 20 is assembled to the internal space of the lower housing 120, and a portion of the platen unit 20 constituting the discharge opening 7 is arranged at a position at which the notch portion 121 is formed.

Since the lower housing 120 has a shape elongated in the front-rear direction, the lower housing 120 can accommodate a roll M formed by winding the printing medium in a rear end portion thereof. The printing medium paid out of the roll M is drawn out of the lower housing 120 through the notch portion 121, and is arranged on a portion of the conveying path T (see FIG. 2) constituted by the platen unit 20 so as to cover the platen unit 20. In this state, the upper housing 110 is moved to be placed above the lower housing 120 such that the platen unit 20 is positioned at the attachment-detachment portion 18 of the main body unit 10. Accordingly, the shaft 2A of the platen roller 2 and the engagement portions 19 are brought into engagement with each other, and the main body unit 10 and the platen unit 20 are assembled to each other.

At this time, the upper housing 110 is arranged on the lower housing 120. The notch portion 111 of the upper housing 110 and the notch portion 121 of the lower housing 120 form an opening portion of the external housing 100, and therefore the discharge opening 7 of the printing device 1 is exposed to the outside through the opening portion. In this way, the user can be provided with a service using the external housing 100 to which the printing device 1 is assembled and having the front surface allowing the printing medium having an image printed thereon is discharged therethrough.

Next, an external housing 200 will be described with reference to FIG. 10. The printing device 101 including the main body unit 10 and the cutter unit 50 can be assembled to the external housing 200. The external housing 200 includes an upper housing 210 and a lower housing 220 that can separate from each other in the up-down direction. The upper housing 210 has a configuration approximately the same as that of the upper housing 110 of the external housing 100. Specifically, the upper housing 210 has a front surface formed with an opening portion 212 through which the operating portion 14 of the main body unit 10 is to be exposed, and a notch portion 211 through which the discharge opening 7 is to be exposed.

The upper housing 210 further has a left surface and a right surface each formed with a pair of screw holes. Bolts 9 are inserted through the respective screw holes formed in the upper housing 210 and are fastened to the corresponding insert nuts 10A embedded in the upper portions of the left surface 11C, the right surface 11D, the left surface 12C, and the right surface 12D of the main body unit 10. Accordingly, the main body unit 10 is assembled to the upper housing 210, and the operating portion 14 is exposed to an outside through the opening portion 212. When the upper housing 210 and the lower housing 220 are assembled to each other, a portion of the cutter unit 50 constituting the discharge opening 55 is positioned at the notch portion 211.

The lower housing 220 has an upper end portion formed with an opening, and an inner space for accommodating therein the cutter unit 50. The lower housing 220 has a configuration substantially the same as that of the lower housing 120 of the external housing 100. Specifically, the lower housing 220 has a front surface whose upper end portion is formed with a notch portion 221 extending in the left-right direction, and has a left surface and a right surface each formed with a pair of screw holes. Bolts 9 are inserted through the respective screw holes formed in the left surface and the right surface of the lower housing 220, and are fastened to the corresponding insert nuts 56 of the left surface and the right surface of the cutter unit 50. As a result, the cutter unit 50 is assembled to the inner space of the lower housing 220, and a portion of the cutter unit 50 forming the discharge opening 55 is positioned at the notch portion 221.

The lower housing 220 has a shape elongated in the front-rear direction to allow a roll M formed by winding the tape-like printing medium to be accommodated in a rear portion of the lower housing 220. The printing medium paid out of the roll M is drawn out of the lower housing 220 through the discharge opening 55 of the cutter unit 50 and the notch portion 221 of the lower housing 220, and is positioned on a conveying path T (see FIG. 6) configured by the conveying unit 50A of the cutter unit 50.

Then, the upper housing 210 is moved to be disposed on the lower housing 220 such that the conveying unit 50A of the cutter unit 50 is positioned at the attachment-detachment portion 18 of the main body unit 10. At this time, the engagement portions 19 are brought into engagement with the shaft 2A of the platen roller 2, whereby the main body unit 10 and the cutter unit 50 are assembled to each other. The upper housing 210 is positioned on the lower housing 220, and the notch portion 211 of the upper housing 210 and the notch portion 221 of the lower housing 220 form an opening portion of the external housing 200 to expose the discharge opening 55 of the cutter unit 50 therethrough. By assembling the printing device 101 to the external housing 200 in this way, the user can be provided with a service using the external housing 200 accommodating therein the printing device 101 that discharges the printed printing medium frontward through the discharge opening 55 and cuts the printed printing medium.

Next, an external housing 300 will be described with reference to FIG. 11. The printing device 201 including the main body unit 10 and the release unit 70 can be assembled to the external housing 300. The external housing 300 includes an upper housing 310 and a lower housing 320 that can separate from each other in the up-down direction. Each of the upper housing 310 and the lower housing 320 has a box-like shape.

The upper housing 310 has a configuration approximately the same as that of the upper housing 110 of the external housing 100, and has a front surface formed with an opening portion 312 and a notch portion 311. When the printing device 201 is assembled to the external housing 300, the operating portion 14 is exposed to the outside through the opening portion 312, and a portion of the main body unit 10 constituting the discharge opening 7 is disposed at the notch portion 311.

The upper housing 310 also has a left surface and a right surface, each of which is formed with a pair of screw holes. Bolts 9 are inserted through the respective screw holes formed in the upper housing 310 to be fastened to the corresponding insert nuts 10A of the upper portions of the left surface 11C, the right surface 11D, the left surface 12C, and the right surface 12D of the main body unit 10. Accordingly, the main body unit 10 is assembled to an inner space of the upper housing 310, and the operating portion 14 is exposed to an outside of the external housing 300 through the opening portion 312. The discharge opening 71 formed in the release unit 70 is to be positioned at the notch portion 311 when the upper housing 310 is assembled to the lower housing 320 accommodating therein the release unit 70.

The lower housing 320 has an upper portion formed with an opening, and the release unit 70 can be accommodated in an inner space thereof. The lower housing 320 has a configuration approximately the same as that of the lower housing 120 of the external housing 100, and has a front surface formed with a notch portion 321 extending in the left-right direction at an upper portion thereof. The notch portion 321 has a dimension in the up-down direction greater than a dimension in the up-down direction of the notch portion 121.

Also, the lower housing 320 has a left surface and a right surface each formed with a pair of screw holes. Bolts 9 are inserted through the respective screw holes formed in the lower housing 320 and are fastened to the corresponding insert nuts 76 of the left surface and the right surface of the release unit 70. As a result, the release unit 70 is assembled to the lower housing 320, and the discharge openings 71 and 72 of the release unit 70 are positioned at the notch portion 321.

The lower housing 320 is elongated in the front-rear direction for accommodating a roll M formed by winding the tape-like printing medium in a rear portion thereof. The printing medium paid out of the roll M is drawn out of the lower housing 320 through the discharge opening 71 of the release unit 70 and the notch portion 321 of the lower housing 320, and positioned on the conveying path T (see FIG. 8) in the conveying unit 70A of the release unit 70. Further, the lid 78 of the release unit 70 is moved to the open position and a mount released from the printing medium in advance is positioned in the mount path U (see FIG. 8). The mount is drawn out of the lower housing 320 through the discharge opening 72 and the notch portion 321. In this state, the lid 78 is moved back to the closed position.

Thereafter, the upper housing 310 is moved and placed on the lower housing 320 such that the conveying unit 70A of the release unit 70 is positioned at the attachment-detachment portion 18 of the main body unit 10. The engagement portions 19 are brought into engagement with the shaft 2A of the platen roller 2, thereby completing assembly of the main body unit 10 and the release unit 70 to each other. At this time, the upper housing 310 is arranged on the lower housing 320. The notch portion 311 of the upper housing 310 and the notch portion 321 of the lower housing 320 form an opening portion of the external housing 300, and the discharge openings 71 and 72 of the release unit 70 are exposed to the outside through the opening portion of the external housing 300. Consequently, by assembling the printing device 201 to the external housing 300 as described above, the user can enjoy a service using the external housing 300 accommodating therein the printing device 201 configured to discharge the printed printing medium through the front surface thereof and to release the mount from the printed printing medium.

Next, an external housing 400 will be described with reference to FIG. 12. The external housing 400 has a substantially tray-like shape, for example, and has an upper portion formed with an opening. The external housing 400 is elongated in the front-rear direction and has an inner space that can accommodate the main body unit 10 in a rear portion thereof. The inner space of the external housing 400 has a dimension in the left-right direction equal to that in the left-right direction of the main body unit 10.

The external housing 400 has a right surface and a left surface. Each of the left surface and the right surface has a pair of screw holes at a rear portion thereof. In order to assemble the printing device 1 to the external housing 400, the main body unit 10 is disposed inside the external housing 400 while the rear surface 12E of the main body unit 10 is directed downward, and four of the bolts 9 are inserted through the corresponding screw holes formed in the external housing 400 and fastened to the corresponding insert nuts 10A of the left surface 12C and the right surface 12D of the main body unit 10. Thus, the main body unit 10 is accommodated in and assembled to the external housing 400 while the discharge opening 7 faces upward. The platen unit 20 is exposed outside of the external housing 400.

The printing medium can be placed in the external housing 400 at a position frontward of the printing device 1 (i.e., a front portion of the external housing 400). For example, the printing medium is a fanfold paper N formed by folding a heat-sensitive label having an elongated shape. In a state where the platen unit 20 is separated from the main body unit 10, the user arranges the printing medium paid out of the fanfold paper N on a portion of the conveying path T constituted by the main body unit 10 (see FIG. 2).

In this state, the platen unit 20 is placed at the attachment-detachment portion 18 of the main body unit 10. The shaft 2A of the platen roller 2 is brought engagement with the engagement portions 19, whereby the main body unit 10 and the platen unit 20 are assembled to each other. The discharge opening 7 is positioned above the external housing 400. In this way, the user can be provided with a service using the external housing 400 to which the printing device 1 is assembled and through which the printing medium having an image printed thereon is discharged upward. Accordingly, the user can easily visually recognize the printing result on the printed printing medium.

Although not illustrated in the drawings, an upper cover having a tray-like shape may be employed for use with the external housing 400. When placed on the external housing 400, the upper cover can cover the printing device 1 as a whole. The platen unit 20 may be assembled to the upper cover. The upper cover has an opening portion that allows the operating portion 14 and the discharge opening 7 to the outside therethrough. With this configuration, when the main body unit 10 and the platen unit 20 are assembled to each other, the printing device 1 can be covered with the external housing 400 and the upper cover.

Further, although not illustrated in the drawings, the main body unit 10 may be assembled to the external housing 400 while one of the cutter unit 50 and the release unit 70 is assembled to the main body unit 10 instead of the platen unit 20. In a case where the cutter unit 50 is assembled to the main body unit 10, the user can be provided with a service in which the printed printing medium is discharged upward of the external housing 400 and the printing medium can be appropriately cut. In a case where the release unit 70 is assembled to the main body unit 10, a service in which the printed printing medium is discharged upward of the external housing 400 can be provided to the user. Further, in the latter case, the user can adhere the printed printing medium to a desired place instantly since the mount has already been released from the printed printing medium.

As described above, since the main body unit 10 and the platen unit 20, the main body unit 10 and the cutter unit 50, and the main body unit 10 and the release unit 70 can be separated from each other at the attachment-detachment portion 18, the printing medium can be easily placed between the printing head 3 and the platen roller 2. Accordingly, replacement of the printing medium can be facilitated.

Further, since the cutter unit 50 includes the conveying unit 50A functioning the same as the platen unit 20 and the cutting unit 50B, the platen roller 2 and the cutting unit 50B can be separated away from the printing head 3 when the printing medium is replaced such that the cutter unit 50 does not hinder the replacement of the printing medium.

Further, since the release unit 70 includes the conveying unit 70A functioning the same as the platen unit 20 as well as the releasing unit 70B, the platen roller 2 and the releasing unit 70B can be placed away from the printing head 3 when the printing medium is replaced, and therefore the release unit 70 does not hinder the replacement of the printing medium.

As described above, selected one of the platen unit 20, the cutter unit 50, and the release unit 70 can be assembled to the main body unit 10 to configure the printing devices 1, 101, and 201 according to the intended use thereof.

When the selected one of the platen unit 20, the cutter unit 50, and the release unit 70 is assembled to the main body unit 10, the engagement portions 19 are engaged with the shaft 2A of the platen roller 2, thereby positioning of the platen roller 2 relative to the printing head 3 can be ensured.

The insert nuts 10A for fixing the printing devices 1, 101, and 201 to the external housing are provided in the main body unit 10, and the insert nuts 20A, 56, and 76 having the same functions as the insert nuts 10A are provided in the platen unit 20, the cutter unit 50, and the release unit 70, respectively. With this configuration, according to the use of the external housing, components in the printing devices 1, 101, and 201 (that is, the main body unit 10, the platen unit 20, the cutter unit 50, and the release unit 70) can be properly fixed to the external housing.

Further, since the main body unit 10 and the selected one of the platen unit 20, the cutter unit 50, and the release unit 70 can be completely separated from each other at the attachment-detachment portion 18 of the main body unit 10, the main body unit 10 and the selected one of the platen unit 20, the cutter unit 50, and the release unit 70 can be detached from the external housing when replacing the printing medium. Consequently, the printing medium can be easily disposed between the printing head 3 and the platen roller 2, thereby facilitating the replacement of the printing medium.

Modifications

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below:

For example, a unit other than the platen unit 20, the cutter unit 50, and the release unit 70 described above may be employed as a platen unit including the platen roller 2. Specifically, in a case where a unit including a linerless platen roller is employed as the platen unit, the linerless platen roller is hard to be adhered to a linerless tape, that is, suitable for use with a linerless tape. Alternatively, a platen unit including the conveying unit 50A, the cutting unit 50B, and the releasing unit 70B may be employed. An external housing to which the printing devices 1, 101, and 201 can be assembled may have a shape other than that described above (i.e., a box-like rectangular parallelepiped shape). The fixed blade 51 and the movable blade 52 of the cutting unit 50B may perform a partial cut, that is, may cut the printed printing medium partially such that a portion which is not cut by the fixed blade 51 and the movable blade 52 remains in the printed printing medium.

REMARKS

The printing devices 1, 101, and 201 are examples of the printing device. The platen unit 20, the cutter unit 50, and the release unit 70 are examples of the platen unit. The platen roller 2 is an example of the platen roller. The roll M and the fanfold paper N are examples of the printing medium. The main body unit 10 is an example of the main body unit. The printing head 3 is an example of the printing head. The attachment-detachment portion 18 is an example of the attachment-detachment portion. The cutting blade 25 is an example of the cutter. The fixed blade 51 and the movable blade 52 are also an example of the cutter. The front surface of the printing medium is an example of the first surface of the printing medium. The back surface of the printing medium is an example of the second surface of the printing medium. The releasing unit 70B is an example of the separator. The platen unit 20, the cutter unit 50, and the release unit 70 are also examples of the another platen unit. The shaft 2A is an example of the shaft of the platen roller. The engagement portions 19 are an example of the engagement portion. The front surface 11A, the upper surface 11B, the left surface 11C, the right surface 11D, the upper surface 12B, the left surface 12C, the right surface 12D, the rear surface 12E, and the bottom surface 12F are examples of the outer surfaces of the main body unit. The surfaces of the outer cover 54 and the surfaces of the outer cover 74 are also examples of the outer surfaces of the main body unit. The front surface 21A, the left surface 21C, the right surface 21D, and the bottom surface 21F are examples of the outer surfaces of the platen unit. The insert nuts 10A are an example of the first fixing member. The insert nuts 20A, 56, and 76 are examples of the second fixing member. The external housings 100, 200, 300, and 400 are examples of the external housing.

What is claimed is:

1. A printing device comprising:
a platen unit comprising a platen roller configured to convey a printing medium; and
a main body unit comprising:
a printing head configured to nip the printing medium in cooperation with the platen roller to perform printing on the printing medium; and
an attachment-detachment portion which the platen unit is attachable to and detachable from,
wherein, when the platen unit is attached to the attachment-detachment portion, the main body unit and the platen unit are assembled as a single unit,
wherein, when the platen unit is detached from the attachment-detachment portion, the main body unit and the platen unit are separated as separate units,
wherein the printing medium has a first surface on which printing is to be performed and a second surface opposite the first surface, the second surface having a release paper adhered thereto through an adhesive agent, and
wherein the platen unit further comprises a separator configured to separate the release paper from the second surface of the printing medium after printing has been performed on the first surface of the printing medium.

2. The printing device according to claim 1,
wherein another platen unit different from the platen unit is attachable to and detachable from the attachment-detachment portion.

3. The printing device according to claim 1,
wherein the another platen unit further comprises a cutter configured to cut the printing medium after printing has been performed on the printing medium.

4. The printing device according to claim 1,
wherein the platen roller comprises a shaft, and
wherein the attachment-detachment portion comprises an engagement portion configured to engage with the shaft of the platen roller when the platen unit is attached to the attachment-detachment portion.

5. The printing device according to claim 1,
wherein the main body unit has a plurality of outer surfaces,
wherein the platen unit has a plurality of outer surfaces,
wherein the main body unit further has at least one first fixing member for fixing the main body unit to an external housing, the at least one first fixing member being provided at each of one or more of the outer surfaces of the main body unit, and
wherein the platen unit further has at least one second fixing member for fixing the platen unit to the external housing, the at least one second fixing member being provided at each of one or more of the outer surfaces of the platen unit.

6. The printing device according to claim 1, wherein the platen unit has a discharge opening allowing the release paper separated from the second surface of the printing medium to be discharged therethrough.

* * * * *